United States Patent
Puopolo et al.

[11] Patent Number: 6,007,597
[45] Date of Patent: Dec. 28, 1999

[54] ELECTRON-BEAM MELT REFINING OF FERRONIOBIUM

[75] Inventors: Richard S. Puopolo; John Roger Peterson, both of Salem; Richard Myers, Albany, all of Oreg.

[73] Assignee: Teledyne Industries, Inc., Albany, Oreg.

[21] Appl. No.: 09/031,608

[22] Filed: Feb. 27, 1998

Related U.S. Application Data

[60] Provisional application No. 60/039,406, Feb. 28, 1997.
[51] Int. Cl.[6] .............................. C21B 11/10; C22B 1/00; C01G 31/00
[52] U.S. Cl. ...................... 75/10.14; 75/10.15; 75/10.46; 75/10.48; 75/10.5; 75/401; 423/62
[58] Field of Search ................................ 75/10.13, 10.46, 75/10.48, 401, 10.12; 423/62

[56] References Cited

U.S. PATENT DOCUMENTS

| | | | |
|---|---|---|---|
| 4,610,720 | 9/1986 | Schmidt et al. ................... | 75/10.48 |
| 4,720,300 | 1/1988 | Nishizawa et al. ................ | 75/622 |
| 5,284,639 | 2/1994 | Sommers et al. .................. | 423/344 |

*Primary Examiner*—Prince Willis
*Assistant Examiner*—Tima McGuthry-Banks
*Attorney, Agent, or Firm*—Shoemaker and Mattare, Ltd.

[57] ABSTRACT

Niobium, Nb, is refined from FeNb by electron beam melt refining. The amount of the impurities in the FeNb which form suboxides with oxygen is optionally determined. Sufficient oxygen is added to form oxides with these impurities. The electron beam melt refining process is carried out at a sufficiently high temperature and under a sufficiently low vacuum so that the impurities are removed as oxides from the liquid Nb and the purified Nb is recovered. Preferably the oxygen is added as an oxygen-containing compound such as $Nb_2O_5$. The recovered Nb can be subjected to additional electron beam melt refining cycles to obtain the desired purity.

11 Claims, 2 Drawing Sheets

ELECTRON-BEAM MELT REFINING OF FERRONIOBIUM

This application claims the benefit of U.S. Provisional Application No. 60/039,406, filed Feb. 28, 1997.

BACKGROUND OF THE INVENTION

1. Field of the Invention

This invention relates generally to the field of extractive metallurgy, and, specifically, to the production of niobium metal (Nb) from its precursor compound metallurgical grade ferroniobium (FeNb) or any similar compound ranging from 20% Nb up to 95% or even higher Nb contents.

2. Description of the Previously Published Art

Niobium is a heat resistant, corrosion resistant metal with many specialized applications. Niobium and its alloys are used in sodium vapor lamp filaments, nuclear reactors, rocket nozzles, superconducting alloys, jewelry, and jet engine afterburners, among many other uses.

Most metallic Nb is produced according to the process of aluminothermic reduction (ATR) of niobium pentoxide, $Nb_2O_5$, with powdered aluminum (Al), according to the reaction

$$3Nb_2O_5 + 10Al \Rightarrow 6Nb + 5Al_2O_3. \quad (1)$$

ATR is an extremely exothermic reaction and it generates sufficient temperature to achieve the melting point of Nb at 2415° C. The slag formed is slightly substoichiometric $Al_2O_3$ and is very viscous. The high viscosity makes separation of the slag and metal difficult resulting in lowered recovery of the Nb metal. For this reason, a slag modifier which will greatly reduce the viscosity of the slag is added in the form of $BaO_2$ (barium peroxide), along with sufficient Al to react with all of the oxygen provided by the $BaO_2$. The reaction is:

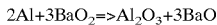

$$2Al + 3BaO_2 \Rightarrow Al_2O_3 + 3BaO$$

The barium must be used as a peroxide to provide sufficient heat to bring the BaO up to the temperature of the other reactants. The metal and slag then separate according to their different liquid densities with the metal on the bottom and the lighter slag on top. The amount of $BaO_2$ is determined by selecting a low melting point in the $Al_2O_3$—$BaO_2$ phase diagram which will facilitate the separation of slag and metal. The slag solidifying last and the metal first after they have separated.

The slag layer contains mostly $Al_2O_3$ with barium oxide, BaO. Of economic import, BaO is toxic, and thus the slag must be treated at some expense prior to disposal. The Nb layer, referred to as a Nb thermite "derby," contains several weight percent Al, up to several thousand ppm oxygen, and trace amounts of other impurities, all of which render the derby material friable and unsuited for conventional metallurgical processes. Electron beam melt refining is the accepted practice to purify the niobium and make it ductile and suitable for fabricating into useful shapes as well as for alloying.

In the electron beam melt refining process, the derby material is hung vertically in an electron beam melting furnace, and exposed to intense electron bombardment under high vacuum conditions. The electron beam causes the material to melt and drip into a water cooled copper ingot mold, thereby forming a consolidated ingot of Nb.

Under the high vacuum conditions within the furnace chamber, volatile impurities within the derby are vaporized at the temperature of liquid Nb. These impurities evaporate away from the pool of liquid Nb maintained in the ingot mold, and condense on the interior walls of the furnace chamber. Iron and some aluminum are removed by simple vaporization in this manner. Nitrogen is removed as gaseous nitrogen. Oxygen is removed as various niobium oxides, such as NbO or $Nb_2O$ in the form of carbon monoxide, CO (if sufficient C is present) or in various suboxides of Al. Many of these compounds are non-stoichiometric, and are formed and liberated only in the intense heat and high vacuum conditions present within the furnace of about 2450° C. and about 0.1 millitorr, as known to those skilled in the art.

The removal of volatile impurities is an exponentially decaying process, in which large amounts are removed during the first electron beam refining melt, but successively smaller amounts are removed during subsequent melts, in which the ingot from a previous melt is remelted to form a new ingot. Experience has shown that typical Nb thermite derbies must be subjected to the electron beam melt refining process several times before Nb of adequate purity is obtained. ATR and electron beam melt refining are described in the book *Extractive Metallurgy of Niobium*, by C. K. Gupta and A. K. Suri, CRC Press, 1994 (referred to as "Gupta" below). ATR is additionally taught in U.S. Pat. No. 2,789,896; Canadian patent 620,036; and the article "Metallothermic Reduction of Oxides in Water-Cooled Copper Furnaces," *Transactions of the Metallurgical Society of AIME*, Vol. 239, pp. 1282–1286.

This method of producing pure Nb is very expensive, but to date has been the only method proven capable of producing adequately pure Nb. A major portion of the expense lies in the production of the precursor compound niobium pentoxide, $Nb_2O_5$.

Most Nb is extracted from Brazilian pyrochlore, a complex ore containing iron, niobium, tantalum, oxygen, barium, phosphorus, silicon, titanium, sulfur, manganese, and other elements. Pyrochlore is subjected to various treatments to concentrate the niobium values and is then subjected to an electric arc smelting process using aluminum as a reductant and iron oxide additions to produce metallurgical grade ferroniobium (FeNb), a nearly stoichiometric intermetallic compound of iron and niobium, which is typically on the order of 65% Nb by weight. Of great significance, FeNb contains appreciable amounts of P and Si, which elements are not always appreciably removed by the process of electron beam melt refining. For this reason, FeNb has not itself, in the past, been successfully subjected to electron beam melt refining as a method of producing pure Nb.

FeNb is sold directly to the steel industry, where it is an important additive for alloying purposes. FeNb is also the starting point for the production of pure $Nb_2O_5$ to be used for the production of ATR pure Nb. There are several methods by which FeNb may be converted to $Nb_2O_5$, two of which are described below. One method is the chlorination of FeNb at a temperature between 500 and 1,000° C., which yields $FeCl_3$ and $NbCl_5$. The $FeCl_3$ is removed by passing the mixed chloride vapors through a bed of NaCl, which forms a eutectic composition with $FeCl_3$ and thereby removes it. The $NbCl_5$ is condensed to a solid and after several additional processing steps is ultimately calcined in a rotary kiln to produce pure $Nb_2O_5$ with only trace amounts of P and Si. This method of producing $Nb_2O_5$ from FeNb is also described in the reference Gupta.

A more recent method is to nitride FeNb by reaction with nitrogen at 1,000° C., producing ferroniobium nitride. An acid solution is then used to dissolve the iron content (also reducing the P and Si content), yielding niobium nitride, NbN. This compound is then calcined to produce $Nb_2O_5$, or NbN may be subjected to a high temperature vacuum heat treatment, which removes enough nitrogen that the product may be subjected to electron beam melt refining without having to undergo ATR. The production of ferroniobium nitride is described in U.S. Pat. No. 5,322,548, Kieffer et al.; by Guidotti et al. in U.S. Pat. No. 3,775,096; by Sommers et al. in U.S. Pat. No. 5,284,639; and in Gupta. Decomposition of NbN to produce pure Nb is taught by Guidotti et al in U.S. Pat. No. 3,775,096; in U.S. Bureau of Mines Report of Investigations 8103, and in Japan Patent JP 0339,426 [91 39,426]. Although the nitride route may offer some cost advantages over the chlorination method, the production of ferroniobium nitride is also relatively expensive.

3. OBJECTS OF THE INVENTION

It is, therefore, an object of the present invention to provide a method for the direct separation of metal values from master alloys of iron, manganese, chromium, cobalt, nickel or vanadium made with metal values from ores or slags by known reduction techniques.

It is also a specific object of the present invention to provide a novel process for recovering Nb metal from its ores while avoiding the difficulties and expense present in the existing method of aluminothermic reduction of $Nb_2O_5$, or in the vacuum thermal decomposition of NbN.

A further object of the invention is to provide a process with a more rapid turnaround time between the formation of the FeNb ingot and the production of pure Nb.

A further object of the invention is to provide a process for refining Nb which does not require the use and subsequent treatment of toxic materials such as barium.

A further object of the invention is to treat FeNb in an electron beam melt refining process so as to remove impurities.

A further object of the invention is to recover Nb metal in high purity from an electron beam melt refining process by adding oxygen to remove the impurities as volatile monoxides or suboxides.

These and further objects of the invention will become apparent as the description of the invention proceeds.

SUMMARY OF THE INVENTION

Ferroniobium, FeNb, which is produced, for example, by the aluminum reduction of pyrochlore concentrates, is treated with a controlled amount of oxygen atoms to remove impurities. A preferred method is to blend with the FeNb a calculated amount of an oxygen-bearing compound and to subject the mixture to multiple cycles of electron beam melt refining, thereby avoiding the production and aluminothermic reduction of $Nb_2O_5$. The oxygen can be added by means other than an oxygen-bearing compound. For example, in the case where the FeNb has been hydrided/dehydrided into a powder, the powder can be contacted with either pure oxygen or atmospheric air. Another example would be to contact the liquid Nb from the electron beam melting with high energy oxygen ions in the form of $O_2^+$ or $O^+$.

DETAILED DESCRIPTION OF THE PREFERRED EMBODIMENTS

Figure 1:
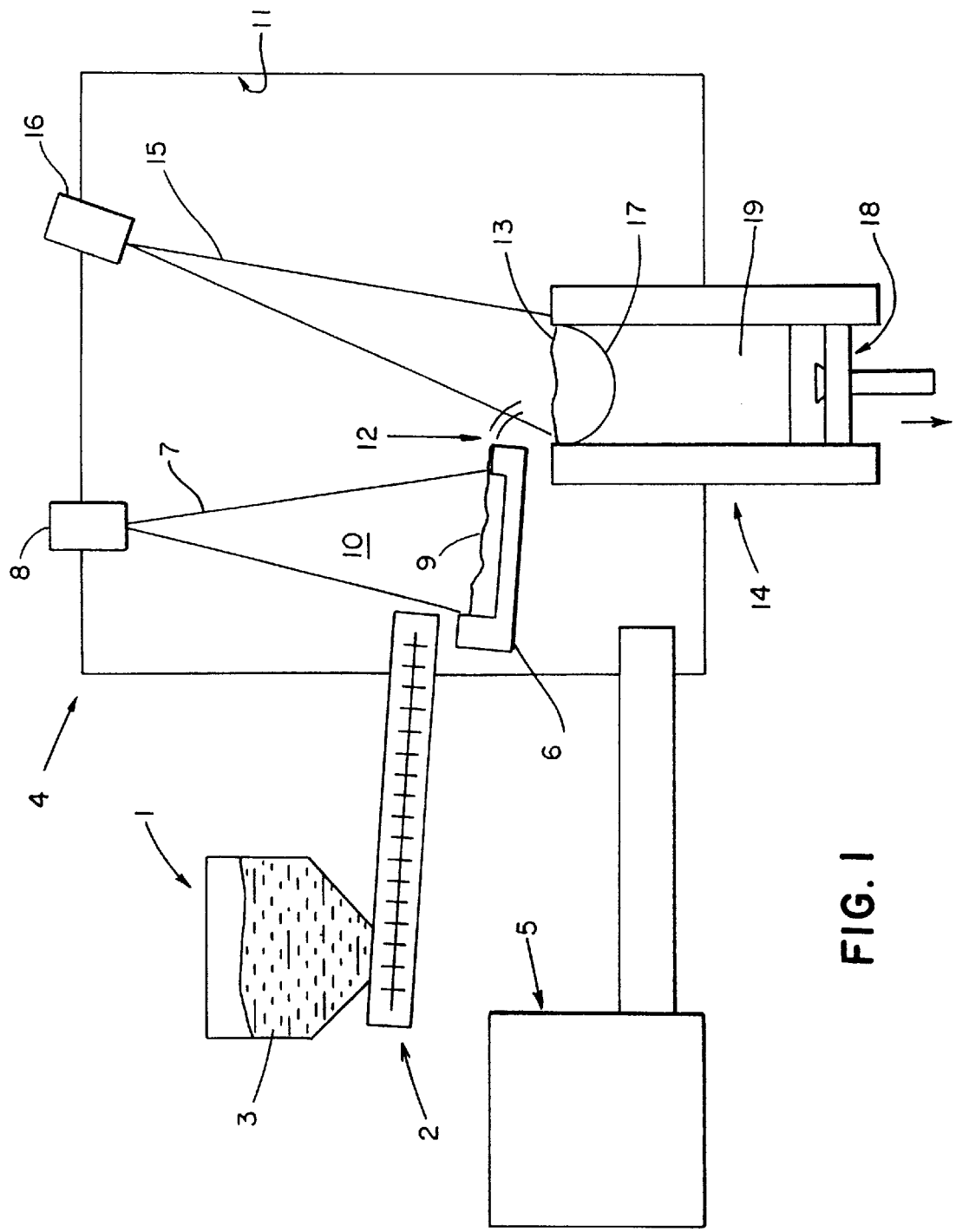
FIG. 1 shows a schematic view of an apparatus suitable for carrying out the initial electron beam refining melt of FeNb.

The process of the instant invention is a novel method of obtaining Nb from the intermediate feedstock compound FeNb. In the most preferred embodiment, the oxygen-bearing compound $Nb_2O_5$ is added. Other compounds and methods of introducing oxygen are discussed below.

The instant invention is based on the unexpected discovery that the presence of oxygen in liquid niobium assists in the removal of P, Si, C, S and other impurities. If, on the other hand, the residual oxygen level approaches zero, then these elements are not removed quickly enough to be economical during electron beam melt refining of Nb. This discovery of adding oxygen in an electron beam melt refining process is believed to be unexpected for at least two reasons.

First, both P and Si have large vapor pressures at the temperature of liquid Nb, as seen in Table 1. As electron beam melting furnaces typically operate at a pressure below $10^{-4}$ atmosphere, it would be expected that these two elements would be removed by simple evaporation, as is the case with Fe, the same values of which are included for comparison. Indeed, one would expect P and Si to be more readily removed than Fe. However, when little residual oxygen is available, that is not the case.

Second, this discovery is also at odds with the fact that oxygen is also considered an undesirable impurity in Nb. It would seem to be counterindicated to actually add oxygen to assist in the refining process.

TABLE 1

| Element | Melting Point (°K.) | Vapor Pressure at 2800° K. (atm) |
| --- | --- | --- |
| Al | 933 | 1.03 |
| Fe | 1809 | 0.198 |
| P | 317 | >>1 |
| Si | 1685 | $2.78 \times 10^{-2}$ |
| Nb | 2740 | $2.37 \times 10^{-6}$ |

It is known that non-stoichiometric niobium suboxides such as $Nb_2O$ and NbO are volatile compounds which are removed from Nb during electron beam melt refining. It is also known that C is removed from liquid Nb by the formation of CO. It is speculated that non-stoichiometric suboxides are formed in the case of Si, P, and other impurities, and that these compounds are more volatile than each respective elemental impurity or compound formed by the impurities, such as silicides or phosphides, under the high temperature, high vacuum conditions present within the furnace. The high temperature, high vacuum conditions are critical to the instant invention, as such compounds do not exist under ordinary conditions.

In general, the temperature should be as high as possible and the pressure as low as possible. The melting temperature of ferroniobium (FeNb) is on the order of 1600° C., but with substantial variance depending on the exact composition. Thus the temperature should be considerably higher than that to evaporate appreciable amounts of iron in a timely fashion. Preferred temperatures are in the range of 1700° C. to 2500° C. and higher with the higher the better. After each melt cycle, the melting point of the more purified product will increase for the next melt cycle, as the iron is evaporated. The first melt cycle might occur at a temperature of 1700° C., while the last, in which mostly pure Nb is melted, might be 2500° C.

As for pressure, the lower the better. However, since large amounts of material are being evaporated, there will an increase in the pressure. Most EB furnaces will not operate at a chamber pressure above 50 microns (50 millitorr). Preferred pressures are in the range of 0.1 to 50 millitorr with again the lower the better. The pressure in the furnace will be high during the first melts such as around 50 millitorr as the bulk of the iron is evaporated and low during the last such as 0.1 millitorr.

During each subsequent electron beam melt refining cycle, decreasing amounts of iron and other impurities (including P and Si sub-oxide compounds) are removed by vaporization, and are either condensed as solids on the furnace chamber or removed through the vacuum system. Although many more melt cycles are required to purify FeNb as compared to electron beam melt refining of Nb thermite derbies, the overall process cost savings are substantial. In addition, the processing time between FeNb and pure Nb is much reduced in the instant invention since many steps are required to produce $Nb_2O_5$ from FeNb for use in the ATR derby process. No toxic materials are required, nor are any generated in the process of electron beam melt refining of FeNb to produce pure Nb. In the derby process barium peroxide is added as a slag modifier for the ATR of $Nb_2O_5$ and there is a significant cost in post treating the toxic Ba containing by-product. The cost of ATR to make the derby is also high because the batch sizes must be of a fairly small size due to the violent exothermic reaction which uses powdered aluminum and the use of aluminum is also moderately expensive itself.

Referring to FIG. 1, a mixture 3 of FeNb and pure $Nb_2O_5$ is placed inside of feed hopper 1. The amount of $Nb_2O_5$ added to the FeNb is based on the amount of C, P, and Si present in the incoming material, which is readily analyzed by those skilled in the art. These amounts may vary considerably, and enough $Nb_2O_5$ is added to provide between 1–25 extra atoms of oxygen for each atom of C, P, or Si present, as may be readily calculated by those skilled in the art. The reason for this that the total amount of P and Si is small and there must be sufficient excess oxygen to ensure contact. Additionally, much of the oxygen itself will be removed in the form of niobium suboxides. This desired oxygen content can also be expressed as a percentage of the Nb content rather than as a percentage of the impurity content. A preferred value would be to have the oxygen content be in an amount up to 25 percent of the Nb content on a molar basis.

Feed hopper 1 is connected directly to auger feeder 2, with the result that when auger feeder 2 rotates, the feedstock mixture 3 of FeNb+$Nb_2O_5$ is fed into electron beam melt refining furnace 4. The furnace 4 is maintained at a pressure of about $10^{-6}$ atmosphere, by vacuum pumping system 5. As the auger is rotated, the feedstock mixture is fed into the water cooled copper hearth 6, where it is melted by electron bombardment beam 7. The electron beam emanates from electron beam gun 8. As the feed mixture melts into the hearth pool 9 maintained by the electron beam 7, volatile impurities evaporate from the pool and diffuse away from it, as indicated in region 10. Any impurities that are solids at room temperature tend to condense on the first cold surface that is encountered, for example the interior walls 11 of the furnace 4. Such impurities include Fe, NbO, $Nb_2O$, Al, and the like. Other impurities, such as nitrogen gas N and carbon monoxide CO (formed by the reaction of carbon with dissolved oxygen in liquid Nb) diffuse toward vacuum pumping system 5 and by its actions are removed from the furnace.

As the molten feedstock mixture which constitutes pool 9 traverses the hearth 6, partial purification occurs as described above. The partially purified liquid metal then flows over the lip 12 of the hearth 6, and into the pool of liquid metal 13 maintained within the water cooled ingot mold 14. The pool of liquid metal is bombarded by the electron beam 15 from the electron beam gun 16, which may be identical to electron beam 7 and gun 8.

As the ingot mold 14 is filled with the partially purified liquid metal enriched in Nb, the metal 17 below the liquid pool 13 freezes due to the action of the cooling water in the ingot mold. An ingot retraction mechanism 18 is activated to slowly withdraw a growing ingot 19 of purified Nb, at such a rate as to maintain a constant level of liquid metal in the mold. When the supply of the feedstock 3 is exhausted, the power to the electron beam guns is shut off, and the Nb ingot 19 is allowed to cool. When the ingot has cooled to a surface temperature of less than about 200° C., the ingot may be removed from the furnace. The ingot will be considerably enriched in Nb content as a weight percentage of the ingot when compared to the composition of the feedstock. However, subsequent electron beam melt refining is required to purify the ingot to an acceptable level.

Figure 2:
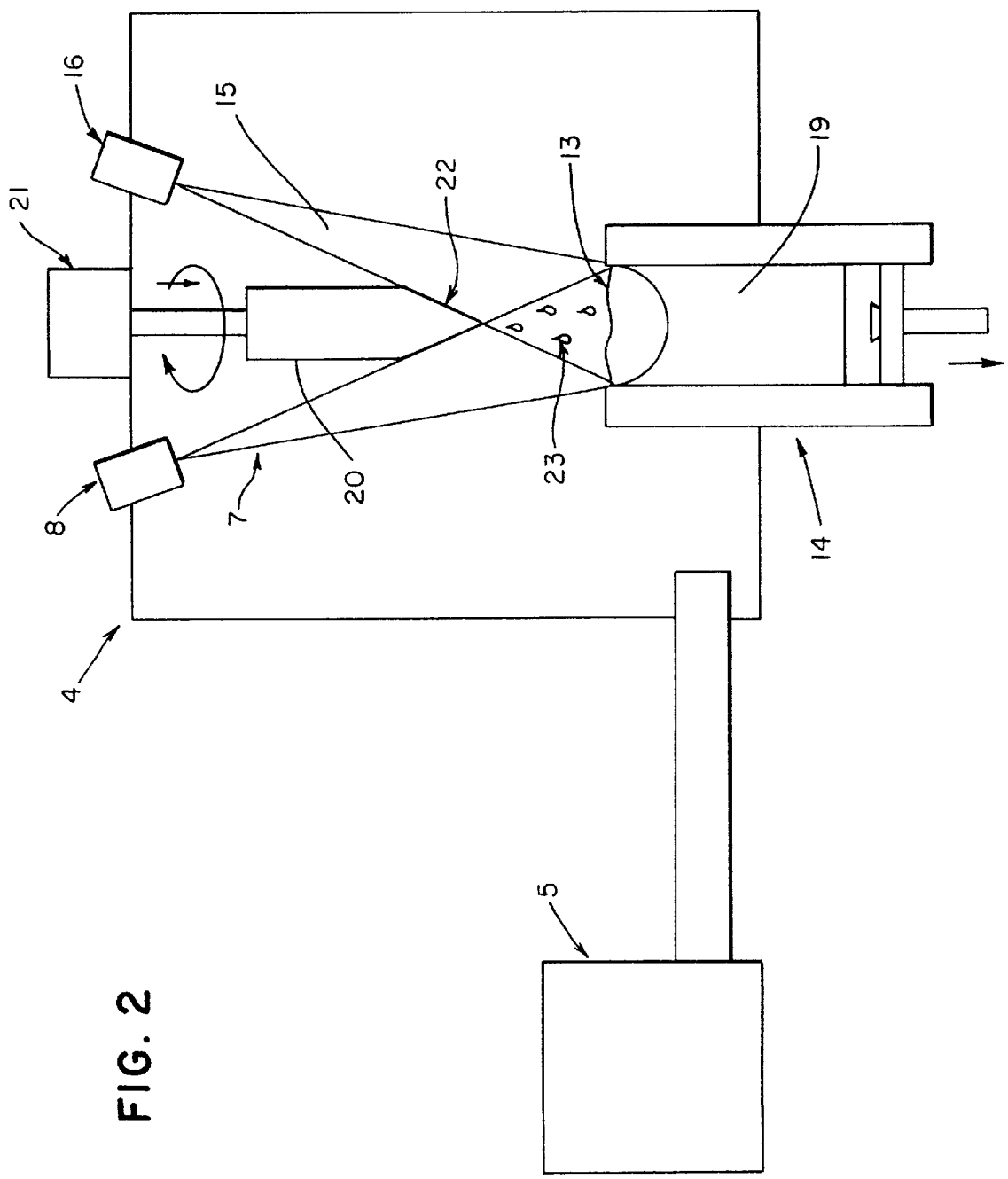
FIG. 2 shows a schematic view of an apparatus suitable for carrying out subsequent electron beam refining melts.

Subsequent electron beam melt refining takes place in the electron beam melt refining furnace shown in FIG. 2. In practice, a furnace as shown in FIG. 1 may be readily configured to operate in the mode of FIG. 2 as will be appreciated by those skilled in the art.

An ingot (now called an electrode) 20 from a previous electron beam melt refining cycle is suspended vertically within the furnace 4 by means of an electrode suspension mechanism 21. Electron beams 7 and 15 produced by electron beam guns 8 and 16 are aimed so that they illuminate both what would be the edge of the cylinder of electrode 20 and the pool of liquid Nb 13 maintained within the ingot mold 14. The electron beams cause the edges of the electrode to melt, resulting in a downwardly projecting conical surface 22 at the end of the electrode. As the electrode material melts, drops of liquid metal 23 fall into the pool 13 and are thereby consolidated into growing ingot 19. As the ingot grows, the ingot retraction mechanism 18 is lowered to maintain a constant level of liquid metal in the ingot mold 14. As the electrode material melts, the electrode suspension mechanism 21 steadily lowers the electrode to maintain a constant position of the conical end of the electrode 22. The electrode suspension mechanism also slowly rotates the entire electrode so as to maintain the conical shape 22.

When electrode 20 has been entirely consumed, the power to the electron beam guns is shut off, and the Nb ingot 19 is allowed to cool. When the ingot has cooled to a surface temperature of less than about 200° C., the ingot may be removed from the furnace. The ingot will be enriched in Nb content as a weight percentage of the ingot 19 when compared to the composition of the input electrode 20. However, subsequent electron beam melt refining may be required to purify the ingot to an acceptable level.

Depending on the composition of the original feedstock mixture of FeNb+$Nb_2O_5$, and on the care with which subsequent electron beam refining melts were performed, a total of between 2 and 10 electron beam melt refining cycles may be required to achieve the desired levels of purity in the Nb ingot product. The desired purity depends on the customer's application for Nb. A typical analysis is shown below in Table 2.

TABLE 2

| Impurity | Analysis ppm |
|---|---|
| Al | <20 |
| C | 55 |
| Cu | <25 |
| Cr | <20 |
| Fe | 30 |
| Mn | <15 |
| N | 50 |
| Ni | <15 |
| O | 150 |
| Si | <25 |
| Ti | 50 |
| V | <25 |

Hardness, DPH: 65

The second and subsequent melt refining cycles will occur in a furnace configured as in FIG. 2. Any configuration which would allow feeding of the meltstock is acceptable such as side feeding or any of a number of techniques. For each cycle, the ingot from the previous cycle is remelted as the electrode of the subsequent cycle.

In general, it is not anticipated that any additional oxygen will be added for subsequent EB remelt cycles; oxygen should only need to be added prior to the first melt. The reason for this is that after the first melt, the product will be in ingot form, wherein it would be difficult to uniformly add oxygen. Prior to the first melt, the starting material is a bulk product into which the oxygen containing compound can be blended or the bulk product itself may be controllably oxidized. However, if additional oxygen is desired then it can be added during subsequent remelt cycles. For example, a gaseous or an oxygen ion generation scheme could be used during any melt cycle for this purpose.

Those skilled in the art will appreciate, for example, that a slower melt rate will maximize the exposure of liquid metal to the high vacuum conditions within the furnace, thereby maximizing the vaporization of volatile impurities. Similarly, vacuum levels as low as possibly attainable will further enhance the removal of volatile impurities.

There are several other methods by which sufficient oxygen may be added to liquid Nb in order that P, Si, and other impurities may be removed by sub-oxide formation during electron beam melt refining. The following oxides could be added $Nb_2O_5$, $TiO_2$, $Al_2O_3$, $SiO_2$, $Fe_2O_3$, $MnO_3$, $MnO_2$, $MnO$, $FeO$, $Fe_2O_3$, $Fe_3O_4$, $CoO$, $NiO$, $CuO$, $Ga_2O_3$, $SnO$, $SnO_2$, $GeO_2$, $PdO$, $AgO$, $CdO$, $Sb_2O_3$, $SbO_2$, $PbO$, $BiO$, $Bi_2O_3$, $ZnO$, $Ti_2O_3$, $In_2O_3$, $InO_2$ $V_2O_3$, $V_2O_3$, $V_2O_4$, $V_2O_5$, or other impurity oxides which are stable at room temperature could be added, as they would supply extra oxygen beyond what is needed for their own removal. However, it is not generally preferred to introduce additional impurity atoms unless they are easily removed in the normal melting process.

Another method is to oxidize the FeNb feedstock material prior to its introduction to the electron beam melting furnace. For example, FeNb powder prepared by hydriding can be used to form the powder. FeNb can be caused to absorb hydrogen, thereby becoming embrittled and easily pulverized into a fine powder, for example, −100 mesh. One scheme for hydridizing FeNb is described in U.S. Pat. No. 5,468,464 by Rossback et al., issued on Nov. 21, 1995, which is incorporated herein by reference in its entirety. After pulverization, the powder can be optionally heated to under 1,000° C. in a vacuum to remove the hydrogen. Either pure oxygen or atmospheric air could be introduced in a controlled and measured fashion, to provide sufficient oxygen to the FeNb feedstock.

One might consider it relatively straight forward to simply introduce a calculated amount of oxygen gas directly into the chamber of the electron beam melting furnace. However, such a method has not proven successful. It is speculated that several mechanisms are responsible for preventing oxygen uptake by liquid Nb, including (1) the net material flux due to evaporation away from the pool, and (2) oxygen molecules that do contact the surface of liquid Nb are immediately removed in the form of NbO or $Nb_2O$. However, it would be possible to fabricate an oxygen ion source, which would permit the bombardment of the pool of liquid Nb with high energy oxygen ions ($O_2^+$ or $O^+$). Such ions would penetrate the pool sufficiently to mix and react with Si, P, and other impurities, which would then be removed as gaseous suboxides.

Having described the basic aspects of the invention, the following examples are given to illustrate specific embodiments thereof.

EXAMPLE 1

1,000 kg of FeNb feedstock is analyzed and found to contain, by weight percent, 66.11% Nb, 32.99% Fe, 0.22% P, 0.20% Si, 0.26% C, and 0.23% O. As may be readily calculated, this would correspond to an equivalent molecular composition of $Nb_{100}Fe_{83}P_1Si_1C_3O_2$. For each mole equivalent of this feedstock, then, at least 3 additional moles of oxygen would need to be added to completely remove the P, Si, and C. If, according to the present invention, an excess oxygen factor of 10 is used, then 30 moles of oxygen would be required, or 6 moles of $Nb_2O_5$, per mole equivalent of feedstock. As one skilled in the art may readily calculate, this would require the addition of 113.5 kg of $Nb_2O_5$ per 1,000 kg of this FeNb feedstock. Those skilled in the art may readily calculate equivalent amounts of other oxygen containing compounds by similar means.

EXAMPLE 2

An ingot of niobium alloy was found to be contaminated by high levels of Si, which proved impossible to remove by repeated cycles of conventional electron beam melting. The ingot was converted to powder by the hydride/dehydride process known to those skilled in the art. The powder was then blended with pure $Nb_2O_5$ in the molar ratio of 10 parts oxygen per part silicon. The resultant blended powdered was then pressed into compacts and again subjected to the electron beam melting process, by means readily known to those skilled in the art. With the added oxygen, the Si was removed to acceptable levels.

It is contemplated that the present invention would also be applicable to Ferro alloys of tantalum (Ta), tungsten (W), molybdenum (Mo) and possibly hafnium (Hf), zirconium (Zr) and titanium (Ti). The present invention would also be applicable if the alloys of tantalum, tungsten and molybdenum used vanadium, chromium, manganese, cobalt or nickel in place of the iron or any combination of those metals as a master alloy. The manufacture of the master alloys could be aluminothermic reduction or electroslag melting or any of the accepted methods of producing master alloys of iron, manganese, chromium, cobalt, nickel or vanadium. The tantalum, tungsten and molybdenum can be concentrated as ores for the aluminothermic reduction to master alloys as is done with niobium from pyrochlores. Tantalites and niobates would have high levels of niobium and tantalum respectively at the level of several percent and this technique would also be a method of separating niobium and tantalum from each other in the case of niobate and tantalate ores without using wet methods. These methods would be very clean environmentally.

It is understood that the foregoing detailed description is given merely by way of illustration and that many variations may be made therein without departing from the spirit of this invention.

What is claimed is:

1. A process for separating and purifying metal values from master alloys of iron, magnesium, chromium, cobalt, nickel, vanadium or mixtures thereof in combination with other metal values selected from the group consisting of niobium, tantalum, tungsten, molybdenum, hafnium, zirconium, titanium and mixtures thereof, which alloys are prepared by ore or slag reduction techniques and contain impurities, said process comprising steps of:

(a) adding sufficient oxygen to the master alloy to form oxides of impurities present;

(b) conducting an electron beam melt refining process on the master alloy with added oxygen at a sufficient vacuum so that oxides of the impurities and master alloy metal to be removed from the other metal values are separated from the melt; and (c) recovering the metal values after the removal of the oxides and master alloy metal.

2. A process according to claim 1, wherein the step of adding oxygen includes adding $Nb_2O_5$.

3. A process according to claim 2, wherein the $Nb_2O_5$ is added in an amount between 1–25 times the excess molar amount of oxygen required to remove impurities in the form of volatile monoxides or suboxides.

4. A process according to claim 1, wherein the step of adding oxygen includes adding a compound selected from the group consisting of $Al_2O_3$, $Fe_2O_3$, $SiO_2$, and mixtures thereof.

5. A process according to claim 1, wherein $Nb_2O_5$ is added to form oxides with the impurities in an amount that is up to 25 percent of the Nb content on a molar basis.

6. A process according to claim 1, wherein prior to the electron beam melt refining process the FeNb is pretreated by (a) treating with hydrogen so as to absorb hydrogen and become embrittled, (b) pulverizing the embrittled FeNb into a fine powder, and (c) heating the fine powder in a vacuum to remove the hydrogen.

7. A process according to claim 6, wherein the embrittled FeNb is pulverized into a fine powder of about −100 mesh.

8. A process according to claim 6, wherein after the fine powder has been heated in a vacuum to remove the hydrogen the FeNb is contacted with either pure oxygen or atmospheric air in a controlled and measured amount to introduce sufficient oxygen to the FeNb.

9. A process for refining Nb from FeNb containing impurities, where Nb in the FeNb can vary from 25% to 95% or more, by electron beam melt refining, comprising steps of:

(a) adding sufficient oxygen to form oxides with the impurities;

(b) conducting the electron beam melt refining process at a sufficiently high temperature and under a sufficient vacuum so that the impurities are removed from liquid Nb; and (c) recovering purified Nb.

10. A process according to claim 9, wherein a total of between about 2 and 10 electron beam melt refining cycles are employed to achieve a desired level of purity in the purified Nb.

11. A process according to claim 9, wherein the oxygen is provided by an oxygen ion source which bombards the liquid Nb with high energy oxygen ions in the form of $O_2^+$ or $O^+$ and these ions penetrate the liquid Nb sufficiently to mix and react with Si, P, and other impurities which are removed as gaseous suboxides.

* * * * *